United States Patent Office 3,396,031
Patented Aug. 6, 1968

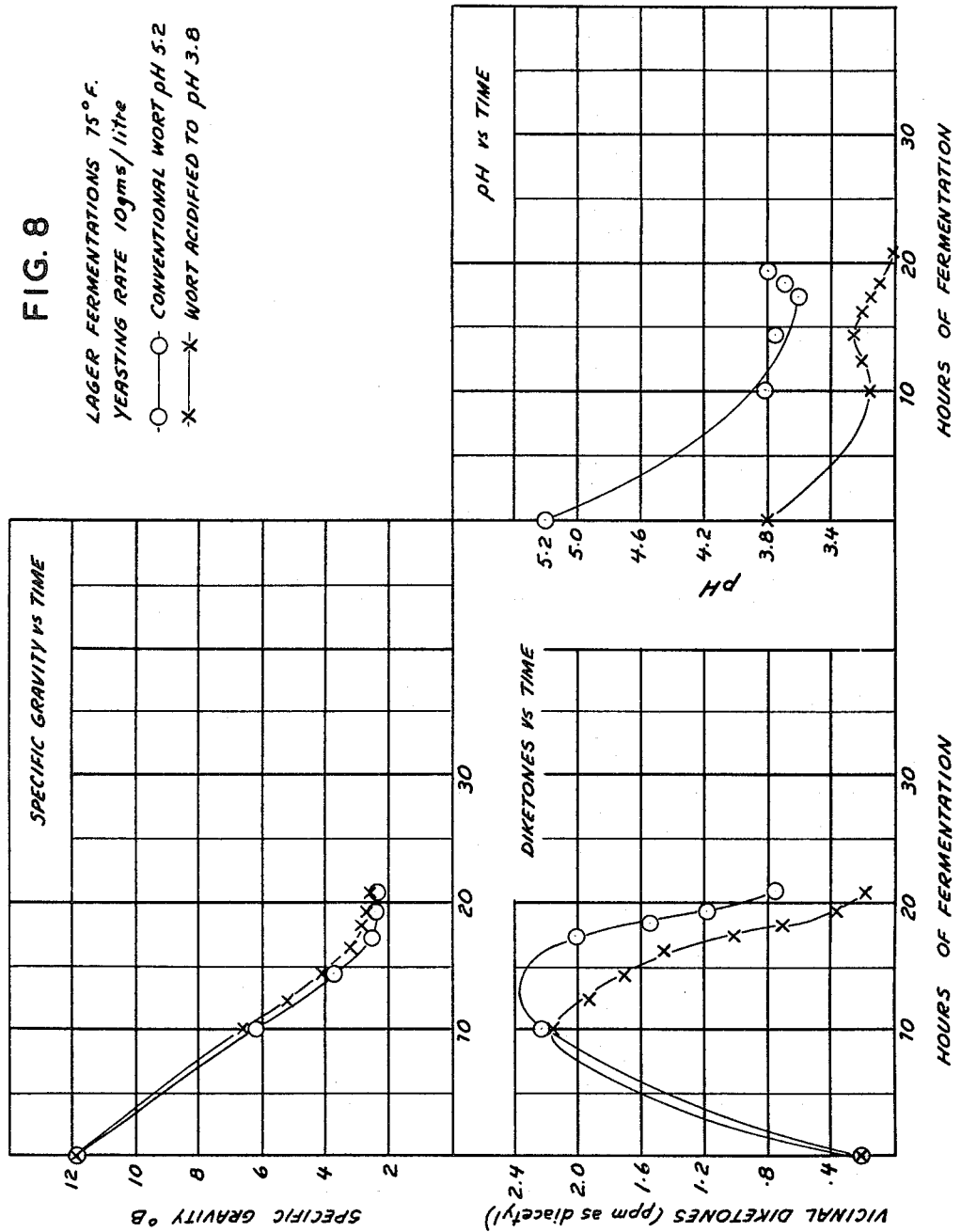

3,396,031
METHOD OF FERMENTATION OF WORT
Robert H. Parsons, Scarborough, Ontario, Leslie John Kormendy, Richmond Hill, Ontario, and Donald S. Jackson, Willowdale, Ontario, Canada, assignors to Canadian Breweries Limited, Toronto, Ontario, Canada
Filed Sept. 23, 1964, Ser. No. 398,718
Claims priority, application Canada, Aug. 5, 1964, 908,678
1 Claim. (Cl. 99—48)

ABSTRACT OF THE DISCLOSURE

This invention concerns the reduction of vicinal diketones in alcoholic brewery beverages at the end of fermentation, and is especially important where higher yeasting rates are employed because in such cases vicinal diketones tend to be present in undesirable amounts at the end of the fermentation stage. Yeast tends to eliminate vicinal diketones from wort as the wort ferments. This invention is concerned with increasing the rate of yeast elimination of vicinal diketones from the fermenting wort, and the result is achieved by the addition of an acidulent to the wort before or during fermentation.

---

This invention relates to the fermenttaion of brewer's wort to make a potable alcoholic beverage such as beer at a high yeasting rate.

It is well established that one can increase the rate of fermentation of brewer's wort by increasing the yeasting rate to higher than conventional levels. In this regard considerable success has been had with yeasting rates of between 10 to 100 gms. of centrifuged yeast paste per litre of wort. The resulting shortened fermentation time is apparently an economy, but it has been found necessary to leave the fermented beer in contact with the yeast for periods of time after the desired conversion of fermentable carbohydrate to alcohol has been completed in order to reduce the concentration of objectionable vicinal diketones to an acceptable level. This contact time detracts from the apparent economy.

It is well established that, in addition to the desired ethanol and carbon dioxide, a number of undesirable by-product constituents such as vicinal diketones and related compounds are produced during the fermentation of wort by brewer's yeast. Among these by-products of yeast fermentation are diacetyl and acetoin. These compounds are related in that they can be transformed one into the other by simple chemical or biochemical processes. Although these by-products are present in minor amounts, they can have a profound and adverse effect on the flavour of beer.

Characteristically when wort is fermented to produce either ale or lager with normal concentrations of yeast at normal temperatures the concentration of diacetyl and acetoin rises to a maximum as fermentation proceeds and then will decrease with time, providing yeast is not removed from the fermenting system, until it reaches acceptable concentrations. However, if one wishes to increase the rate of fermentation by increasing the yeasting rate to higher than convention levels (say to 10–100 gms. of centrifuged yeast paste per litre of wort), then while fermentation takes place extremely rapidly and end gravity is reached in a short time the concentration of diacetyl or other diketones, and acetoin will be very high at the end of fermentation and the product is not potable. This is graphically illustrated in FIGURES 1 and 2 to referred to later. According to presently known art it is necessary to leave the fermented beer in contact with yeast for periods of time after the desired conversion of fermentable carbohydrate to alcohol has been completed in order to reduce the concentration of diacetyl and other related products to an acceptable level. This is undesirable from an economic point of view as well as increasing the danger of imparting a yeasty or autolyzed flavour to the product. In other words we have found that one cannot take full advantage of the use of high yeasting rates which increase the speed of fermentation.

We have found that if one lowers the pH of the wort before or during fermentation the rate of elimination of diacetyl from the fermenting wort by yeast is greatly increased and the residual diacetyl content of the beer at the normal attenuation limit when using high yeasting rates is well within acceptable commercial limits.

Wort efficiently made has a pH of about 5.2 at the end of the conversion of starch to fermentable carbohydrate. The pH can drop from this figure but if it drops materially, it may lead to inefficient conversion. This invention is concerned with worts that are efficiently made, that is, worts that have a pH of at least 4.9 at the completion of conversion of starch to fermentable carbohydrate because it is with these worts that one experiences difficulty with excessive diacetyl and like undesirable by-products at the end of normal fermentation when high yeasting rates are employed. The term wort as used in the specification refers to the liquid at the completion of conversion. As indicated above, this invention deals with the adjustment of the pH of the wort before or during the fermentation thereof and the adjustment can take place at any time after a completion of conversion of the starch to fermentable carbohydrate, provided of course that it is done sufficiently before the completion of fermentation of the wort to achieve the desired effect.

The invention, then, concerns the fermentation of brewer's wort having a pH value of at least 4.9 at the completion of conversion of starch to fermentable carbohydrate wherein the wort is yeasted at a rate of at least 10 gms. per litre and it consists essentially of a method of reducing the vicinal diketones and other related products present at the end of fermentation comprising the addition of an acidulant before the specific gravity reaches 3.8° Balling to reduce the pH to within the range of 3.1 to 3.8 when the specific gravity subsequently reaches between 2.2 and 2.6° Balling, the said specific gravity being indicative of the end of fermentation. The invention will be clearly understood after reference to the following detailed specification read in conjunction with the drawings.

In the drawings:

FIGURES 3 to 8 illustrate graphically the results of Examples I to IV of the invention described herein.

As it has been indicated above, it has been found that the level of vicinal diketones, prominent among which is diacetyl, can be reduced to an acceptable level by the time fermentation is completed by reducing the pH value of the wort before or during the fermentation stage. By an acceptable level in the specification is meant less than 0.2 p.p.m. and preferably about 0.1 p.p.m. Fermentation progress is indicated by a specific gravity and a specific gravity of between 2.2–2.6° Balling usually indicates the end of fermentation. The vicinal diketones referred to are those detected by the test of Owades et al. (Amer. Brewer, vol. 94, No. 1, p. 23, 1961).

The importance of having the vicinal diketones content low at this stage is that the yeast can be separated from the wort immediately after fermentation is completed without waiting for the subsequent reduction of vicinal diketones to an acceptable level by further yeast contact.

The following six examples will illustrate the invention.

Example I

Regular production hopped brewery lager wort was obtained, aerated according to conventional practice and pitched with lager yeast at a concentration of 30 gms. of centrifuged yeast paste per litre of wort. The pH of this wort was 5.2 according to the normal practice of this brewery. Following is an analysis of lager wort from this brewery.

Wort analysis

| | |
|---|---|
| Extract | 12.20 |
| pH | 5.2 |
| Sugar in extract _____percent__ | 76.2 |
| Protein extract _____do____ | 5.0 |
| Calcium _____p.p.m__ | 100 |
| Salt as NaCl _____p.p.m__ | 713 |
| Isohumulones (Rigby method)_____p.p.m__ | 17.3 |

Figure 1:
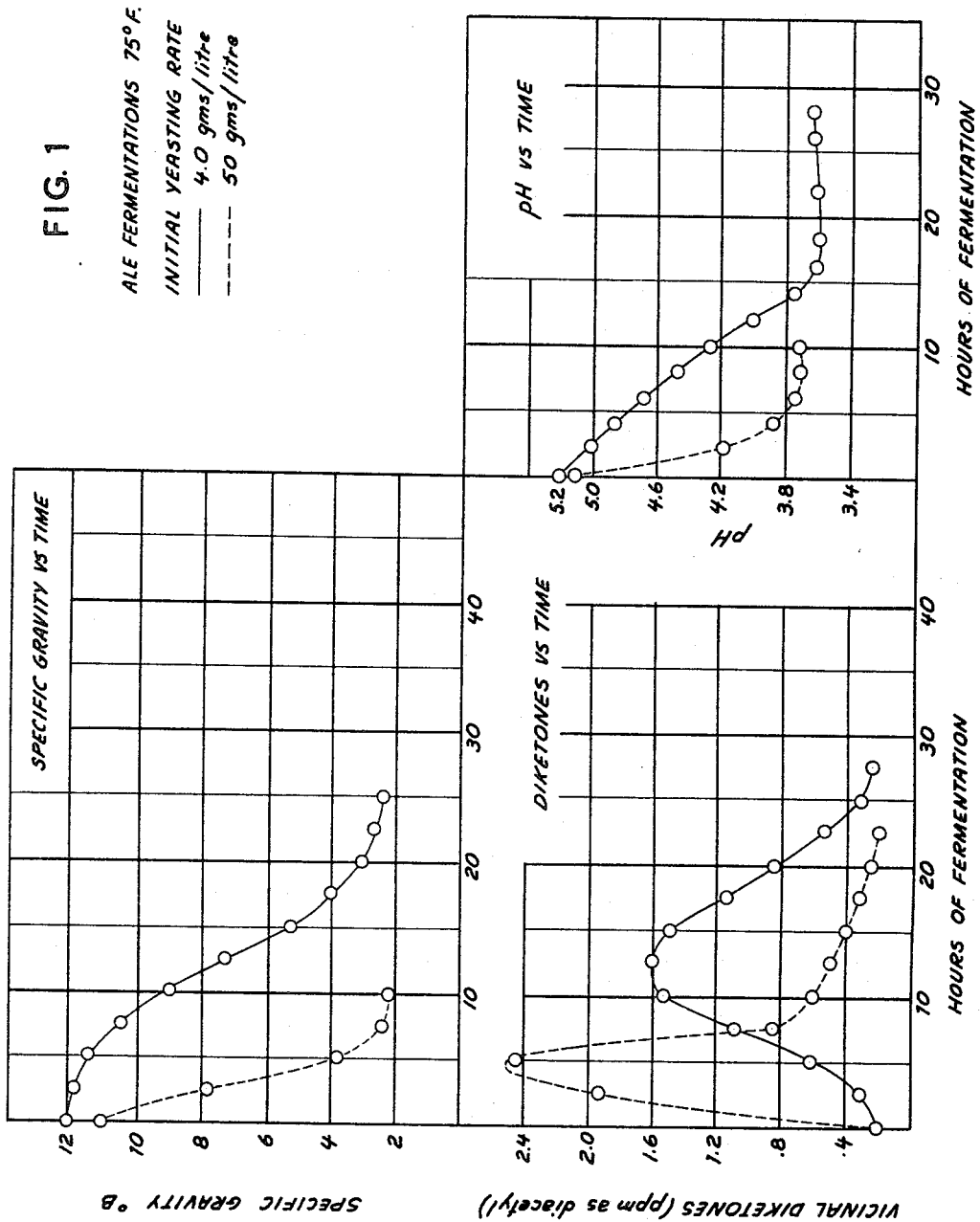
FIGURES 1 and 2 illustrate the variation of specific gravity, diketone content, and pH with time at yeasting rates of 4 gms. per litre and 50 gms. per litre without using this invention.
Figure 2:
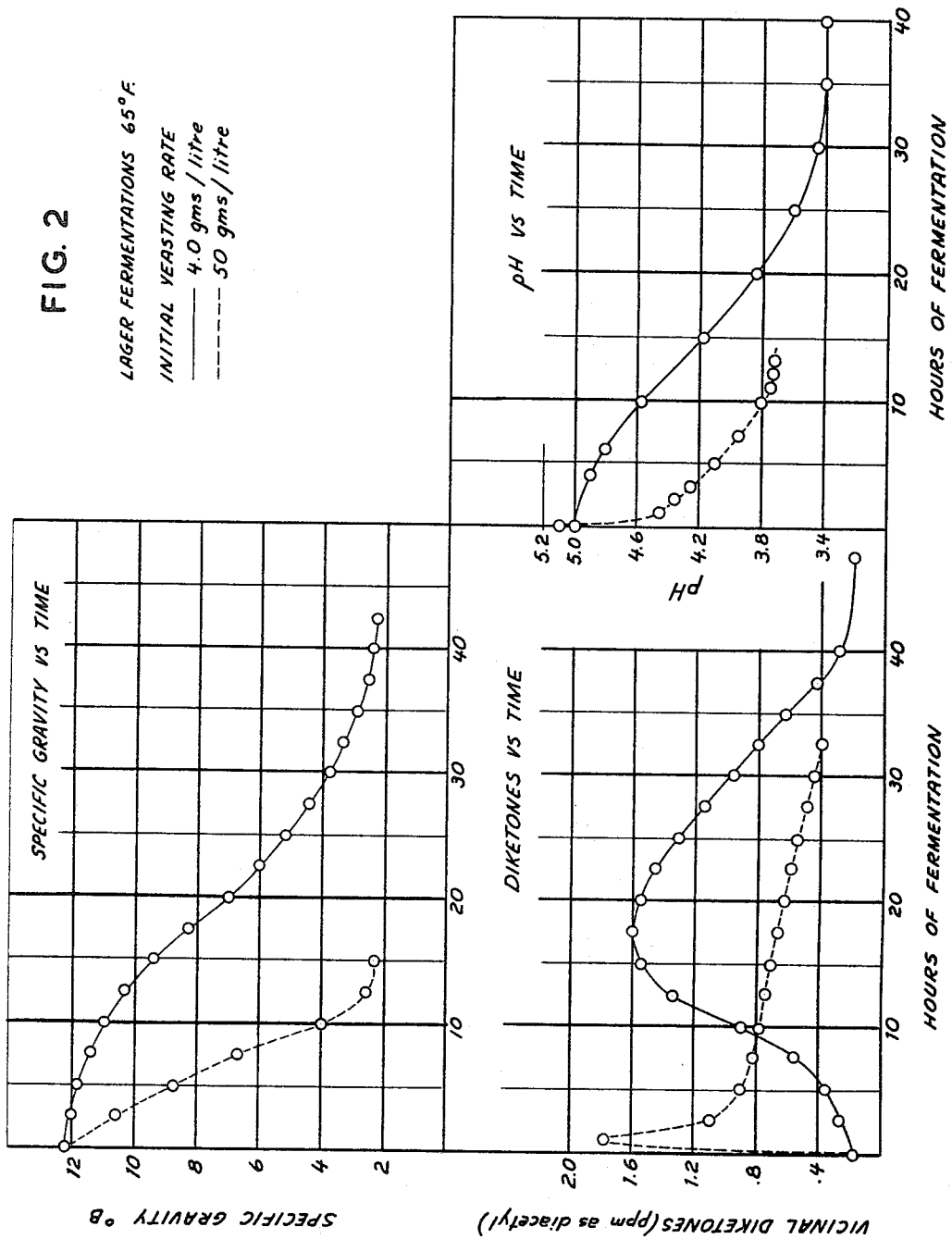
Figure 3:
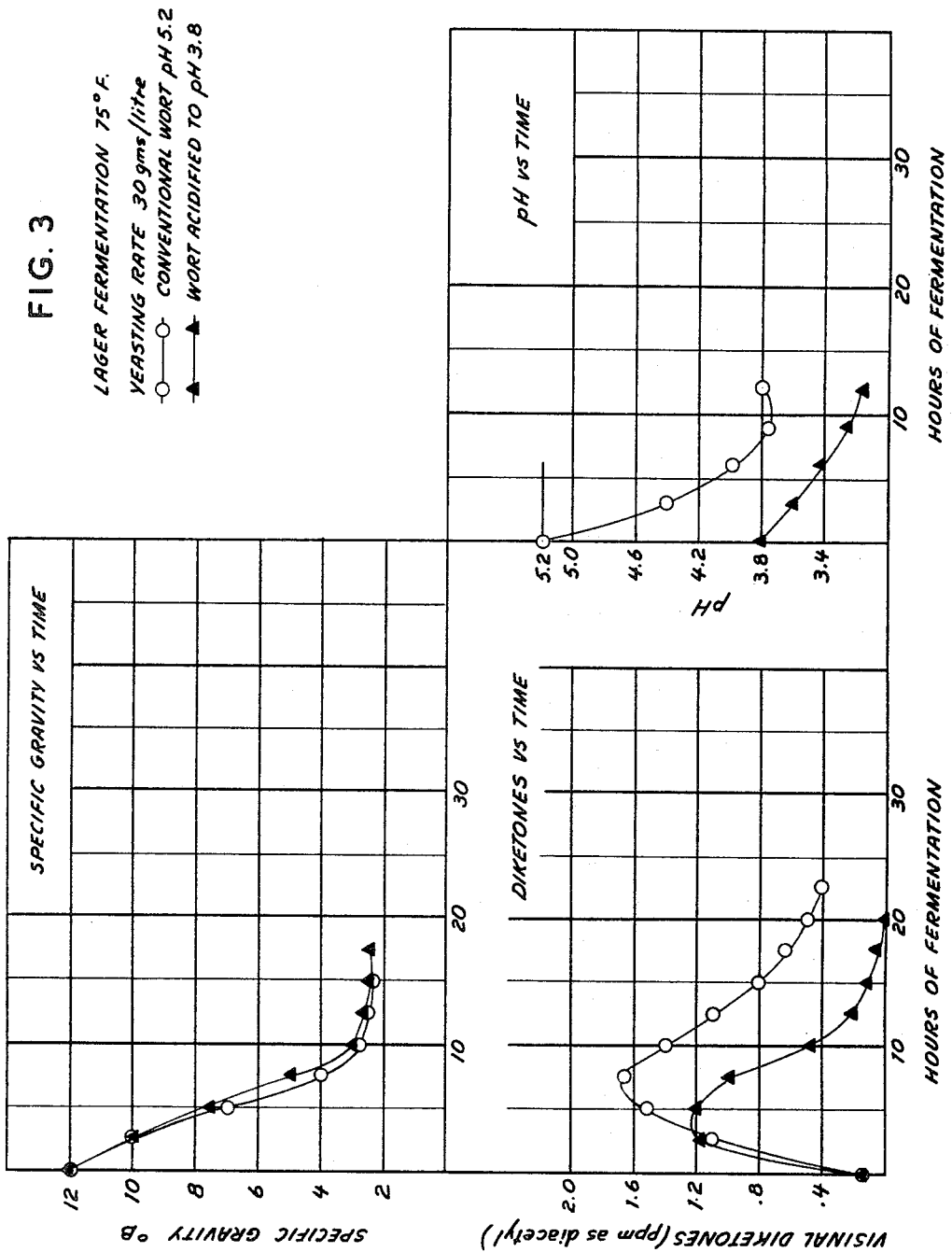

Another sample of the same wort was acidified with phosphoric acid to pH 3.8 before pitching. Experience had shown that acidification of this wort to this extent before pitching allowed the pH to reach the desired range at the optimum time. Both fermentations were carried out at 75° F. The specific gravity of the fermenting beer was measured from time to time after according to the A.S.B.C. test. The content of diketones including diacetyl was measured according to the method of Owades et al. (A.S.B.C. proceedings vol. 94, No. 1, p. 23, January 1961). The course of both fermentations is illustrated in FIGURE 3.

Example II

Figure 4:
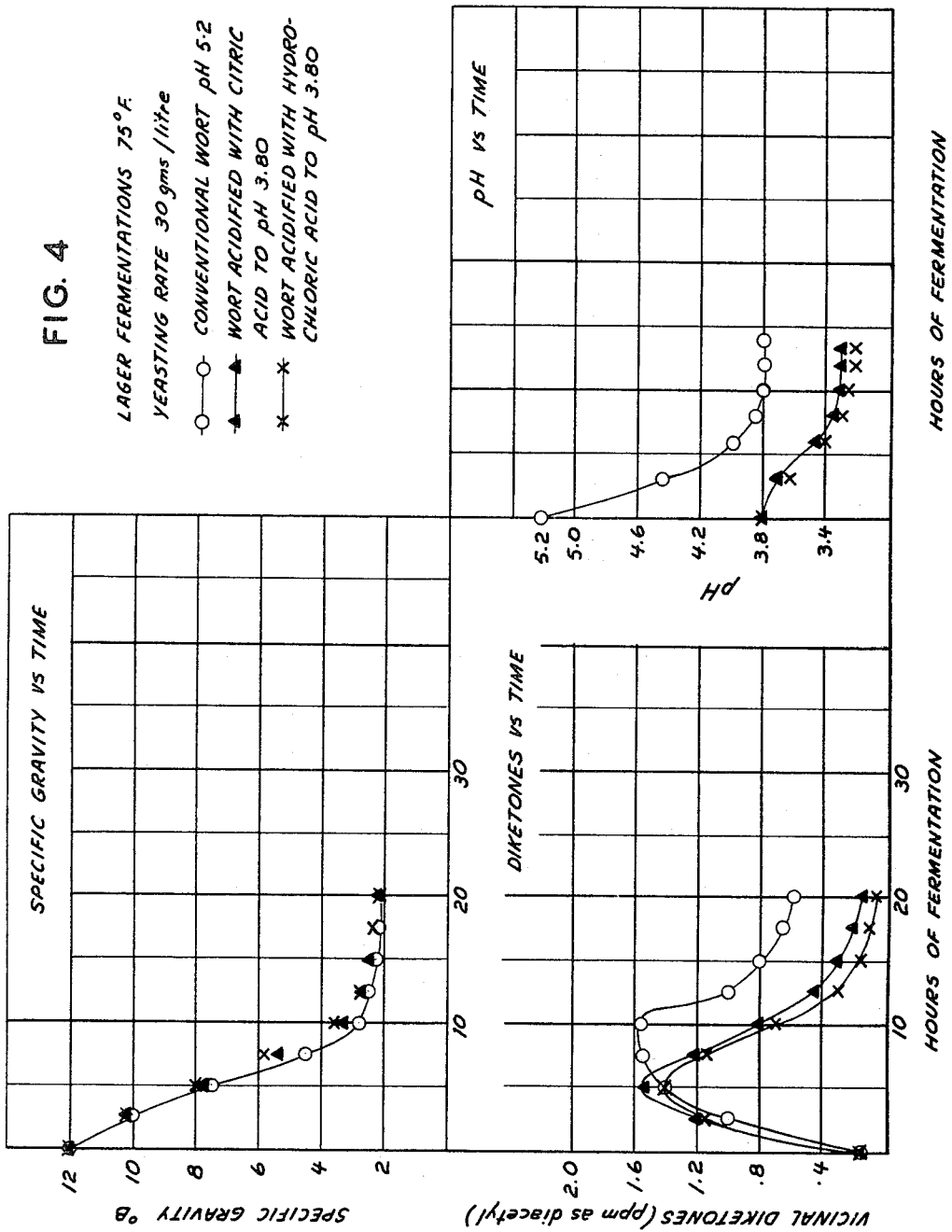

Regular production hopped brewery lager wort similar to that of Example I was obtained, aerated according to conventional practice and pitched with lager yeast at a concentration of 30 gms. of centrifuged yeast paste per litre of wort. The pH of this wort was 5.2. Two additional lots of the same wort were obtained, one was acidified with citric acid to pH 3.80 and the other with hydrochloric acid to pH 3.80 and the acidified worts so obtained were fermented under identical conditions to the control at 75° F. The concentration of diketones including diacetyl was measured throughout fermentation. The course of these fermentations is illustrated in FIGURE 4.

Example III

Figure 5:
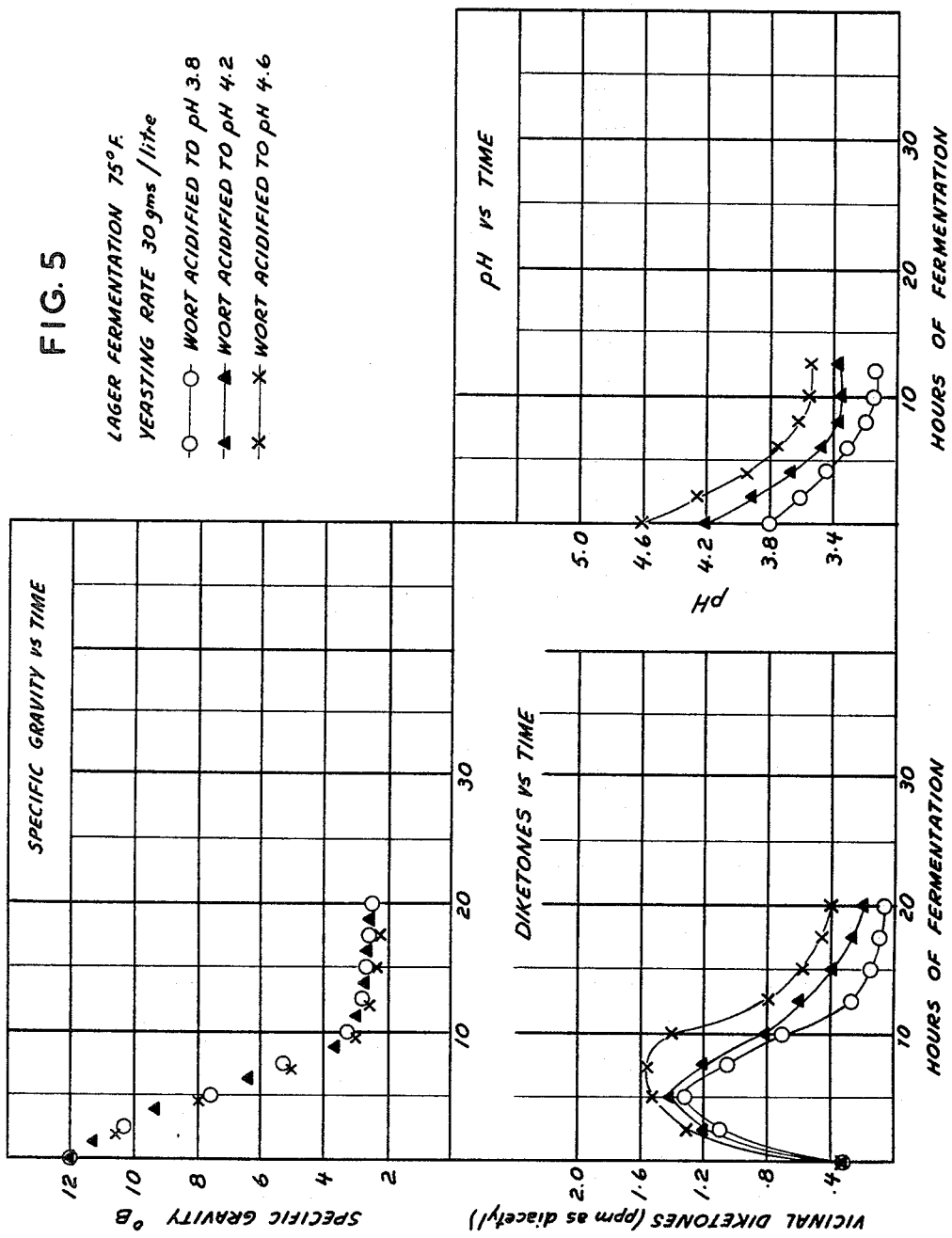

Regular production hopped brewery lager wort similar to that of Example I was obtained, aerated according to conventional practice and pitched with lager yeast a concentration of 30 gms. of centrifuged yeast paste per litre of wort. Three parallel fermentations were carried out in which the wort was acidified to differing degrees with phosphoric acid before pitching. The course of these fermentations is illustrated in FIGURE 5.

Example IV

Figure 6:
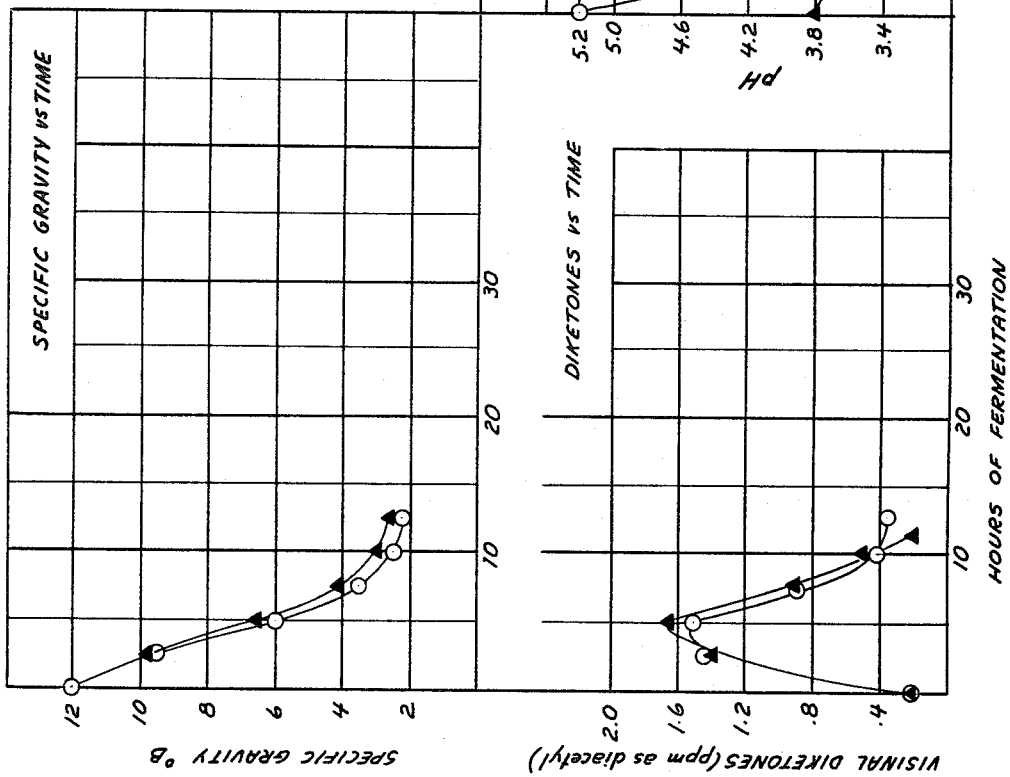

Regular production hopped brewery wort was obtained, aerated according to conventional practice and pitched with ale yeast at a concentration of 30 gms. of centrifuged yeast paste per litre of wort. The pH of this wort was 5.2. Another lot of the same wort was acidified with phosphoric acid to pH 3.80. Both worts were fermented under identical conditions at 75° F. The course of these fermentations is illustrated in FIGURE 6.

Example V

Figure 7:
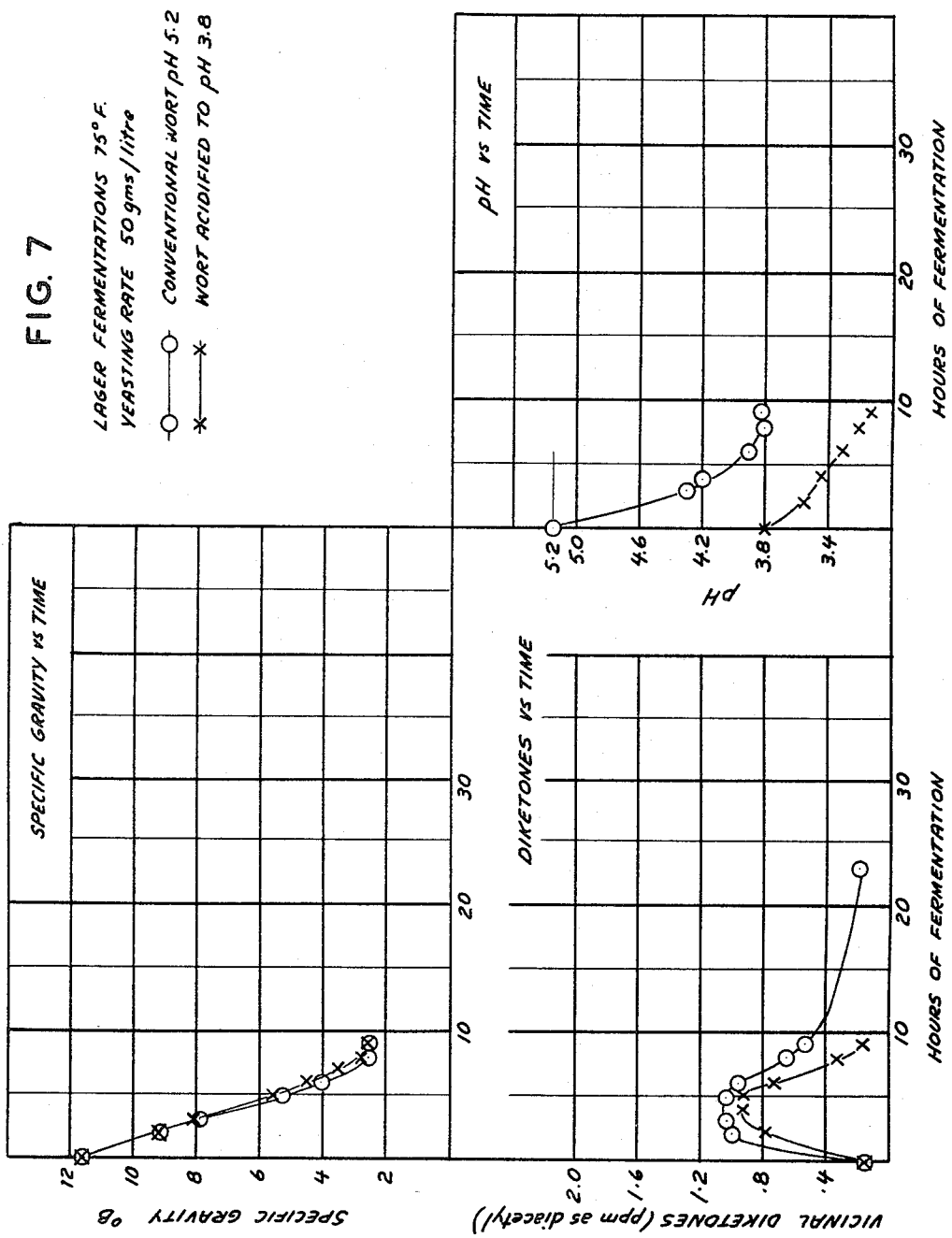

Regular production hopped brewery lager wort similar to that of Example I was obtained, aerated according to conventional practice and pitched with lager yeast at a concentration of 50 gms. of centrifuged yeast paste per litre of wort. The pH of this wort was 5.15. Another lot of the same wort was acidified with hydrochloric acid to pH 3.80. Both worts were fermented under identical conditions at 75° F. The course of these fermentations is illustrated in FIGURE 7.

Example VI

Regular production hopped brewery lager wort similar to that of Example I was obtained, aerated according to conventional practice and pitched with lager yeast at a concentration of 10 gms. of centrifuged yeast paste per litre of wort. The pH of this wort was 5.2. Another lot of the same wort was acidified with phosphoric acid to pH 3.80. Both worts were fermented under identical conditions at 75° F. The course of these fermentations is illustrated in FIGURE 8.

From the above it will be apparent that when the pH during fermentation is lowered into a specified range, the rate of elimination of diacetyl-like ketones is increased. There is, however, a limit to which the pH can be reduced because if the pH at the end of fermentation is unduly low the yeast activity slows down considerably with the result that it becomes very difficult to reach the required and specific gravity. According to good brewery practice, it is not desirable to have a pH of less than 3.15 at the end of fermentation.

The specific examples of the invention employed worts having a pH of 5.2. This, as indicated above, is the pH of the wort after conversion and is a desirable pH from the point of view of achieving an efficient use of grain in a brewery operation. The invention, however, is useful with worts that are manufactured at somewhat less than maximum efficiency. It would be useful, for example, with worts having a pH as low as 4.7.

The foregoing examples indicate yeasting rates of 10, 30 and 50 gms. per litre. A standard yeasting rate is in the neighbourhood of 4 gms. of yeast paste per litre. This invention is useful with yeasting rates over 10 gms. per litre because it is with such yeasting rates that one encounters the problem of an undesirable level of vicinal diketones at the end of fermentation which can effectively be overcome with this invention.

The time that the acid is added is capable of considerable variation within the scope of the invention. A wort, could for example, be acidified immediately after the completion of conversion of the starch to fermentable carbohydrate, that is, before certain of the sparging and other treatments that it is subjected to after conversion, but before fermentation. The acid might also be added after fermentation begins. It has been found that if the acidulant is added before the specific gravity of the fermenting wort reaches 3.8° Balling it will have the desired effect on the fermenting beverage. The quantity of acid added is a quantity sufficient to reduce the pH at the end of fermentation preferably to about 3.2. The end of fermentation is indicated by a specific gravity of 2.2 to 2.6° Balling. However, as indicated by the data of Example III (FIGURE 5) control over residual vicinal diketones is achieved to varying degrees as the pH is varied over a wide range. An end pH of between 3.15 to 3.8 is within the scope of the invention. The pH chosen will in all cases be governed by taste decisions as to the effect of acidification vs. the amount of vicinal diketones that can be tolerated.

Acids other than those noted above have been tested and found effective: lactic, citric, tartaric, phosphoric, hydrochloric, sulphuric and nitric. It is thus apparent that the particular acidulant used to achieve the reduction in pH is not important. The inventive concept is a high yeasting rate in combination with a low pH wort.

While the particular by-products analyzed for in the above noted tests are diacetyl and the diacetyl-like ketones which respond to the alpha naphthol test of Owades, it is apparent that this technique exerts control on many other by-products. In particular those which are known to be involved in the metabolic pathway which includes diacetyl. Among these products are diacetyl and acetoin. Other products which have a known or reasonable association with the metabolism of diacetyl may be reduced with the vicinal diketones.

Embodiments of the invention other than those indicated herein will be apparent to those skilled in the art, and it is not intended that this invention should be limited by the foregoing specific disclosures.

What we claim as our invention is:

1. In the yeast fermentation of brewers' wort to make a potable alcoholic beverage, said wort having a pH of at least 4.9 at the completion of conversion of starch to fermentable carbohydrate, wherein the wort is yeasted at a rate of at least 10 grams per litre, the improved step of increasing the rate of yeast elimination of vicinal diketones from the fermenting wort by the addition of an acidulent to the wort before the specific gravity reaches 3.8 Balling in an amount to reduce the pH of the wort to a range of between 3.15 and 3.8 at the end of fermentation, as indicated by a specific gravity of below 2.6 Balling.

References Cited

UNITED STATES PATENTS

| | | | |
|---|---|---|---|
| 2,157,633 | 5/1939 | Schapiro | 99—31 |
| 3,113,029 | 12/1963 | Hernandez | 99—31 X |

FOREIGN PATENTS 785,308  10/1957  Great Britain.

OTHER REFERENCES

Hind, H.L.: "Brewing Science and Practice," vol. 2, 1950, publ. by Chapman & Hall Ltd., London, p. 924.

MAURICE W. GREENSTEIN, *Primary Examiner.*